(12) United States Patent
Waters et al.

(10) Patent No.: US 6,359,619 B1
(45) Date of Patent: Mar. 19, 2002

(54) METHOD AND APPARATUS FOR MULTI-PHASE RENDERING

(75) Inventors: Richard C. Waters, Concord; Thouis R. Jones; Ronald N. Perry, both of Cambridge; Larry D. Seiler, Boylston, all of MA (US)

(73) Assignee: Mitsubishi Electric Research Laboratories, INC, Cambridge, MA (US)

( * ) Notice: Subject to any disclaimer, the term of this patent is extended or adjusted under 35 U.S.C. 154(b) by 0 days.

(21) Appl. No.: 09/336,387

(22) Filed: Jun. 18, 1999

(51) Int. Cl.$^7$ .............................................. G06F 15/00
(52) U.S. Cl. ..................................................... 345/426
(58) Field of Search .............................. 345/426, 427, 345/428, 581, 589, 617, 618

(56) References Cited

U.S. PATENT DOCUMENTS

| | | | |
|---|---|---|---|
| 5,864,342 A | 1/1999 | Kajiya et al. | 345/418 |
| 6,222,937 B1 * | 4/2001 | Cohen et al. | 382/154 |
| 6,292,194 B1 * | 9/2001 | Powell, III | 345/430 |

OTHER PUBLICATIONS

Loren Carpenter; "The A–Buffer, an Antialiased Hidden Surface Method"; *Computer Graphics*, vol. 18, No. 3, Jul., 1984; pp. 103–108.

McCormack et al.; "Simple and Table Feline: Fast Elliptical Line for Anisotropic Texture Mapping"; WRL Research Report 99/1; Jul., 1999, available at www.research.digital.com/wrl/techreports/pubslist.html.

J. Torborg et al.; "Talisman: Commodity Realtimne 3D Graphics for the PC"; *Computer Graphics Proceedings, Annual Conference Series*; 1996; pp. 353–363.

Lance Williams; "Pyramidal Parametrics"; *Computer Graphics*, vol. 17, No. 3; Jul., 1983; pp. 1–11.

* cited by examiner

*Primary Examiner*—Phu K. Nguyen
(74) *Attorney, Agent, or Firm*—Dirk Brinkman (57) ABSTRACT

In a method for rendering an evolving three-dimensional scene description as a series of two-dimensional images (frames), the evolving scene description includes object geometries G and their associated shader procedures S. Each shader procedure S is factored into a static procedure $S_s$ and a dynamic procedure $S_d$ such that $S(A,I)=S_d(S_s(A,R),I)$, where A denotes the appearance parameters required to shade objects, I denotes an instance of the control parameters, and R denotes a range of control parameters which include I. Similarly, the rendering procedure TSI (transform, sample, and interpolate) for object geometry is factored into a static procedure $TSI_s$ and a dynamic procedure $TSI_d$ such that $TSI(G,I)=TSI_d(TSI_s(G,R),I)$. The factorization of both S and TSI is chosen to significantly reduce the overall rendering time for the evolving scene. Specifically, viewpoint independent or weakly viewpoint dependent computations $S_s(A,R)$ and $TSI_s(G,R)$ are computed in the static phase of rendering and stored either as independent data structures or as a single combined data structure called the internal representation. This internal representation is then processed by the dynamic phase of rendering to produce each frame. Since the required dynamic computations to produce a frame are significantly reduced and the required static computations run infrequently both as a result of a clever factorization and an efficient internal representation, the overall rendering time is reduced.

30 Claims, 5 Drawing Sheets

METHOD AND APPARATUS FOR MULTI-PHASE RENDERING

FIELD OF THE INVENTION

This invention relates generally to rendering two-dimensional images representing three-dimensional objects, and more particularly, to transforming, sampling, interpolating, and shading in multiple phases.

BACKGROUND OF THE INVENTION

When rendering three-dimensional objects, two-dimensional images are generated using a computational description of a scene. The description specifies the scene as a collection of three-dimensional objects and associated shader procedures. There are many formats in which individual objects can be represented ranging from a mesh of non-uniform rational B-spline surfaces (NURBS) to an array of independent three-dimensional points. A single description of the scene may utilize many of these formats. However, no matter what format is used, the basic task is to render a two-dimensional output image that represents the scene.

Multiple output images (frames) can be rendered, over time, to form an animated sequence. Usually, there are twenty-four to thirty frames for every second of the animated sequence. Typically, many successive frames in the animated sequence are nearly identical. The background remains relatively constant, while only a small number of objects move with respect to each other, and, perhaps, some objects are added while others are removed.

Further, the viewpoint may change, but typically only by a small amount from one frame to the next.

To take advantage of the similarity of successive frames, the input to the animation system is often specified as an evolving scene description. The evolving scene description is incrementally modified between successive frames to reflect changes in, for example, object position, viewpoint, or the like. The evolving scene description can then be rasterized using image coordinates, and interpolated to generate samples which are shaded by applying the appropriate shader procedures.

A shader is a key element of a three-dimensional renderer. Shading deals with light, shape, material, and texture to determine the appearance of visible surfaces from projective geometry. Because viewers are extremely sensitive to subtleties in shading, the shader must have the flexibility to provide rich images that substantially duplicate the visual reality of the physical world. Because shading can involve complex computations, the shader should also be efficient.

Figure 1:
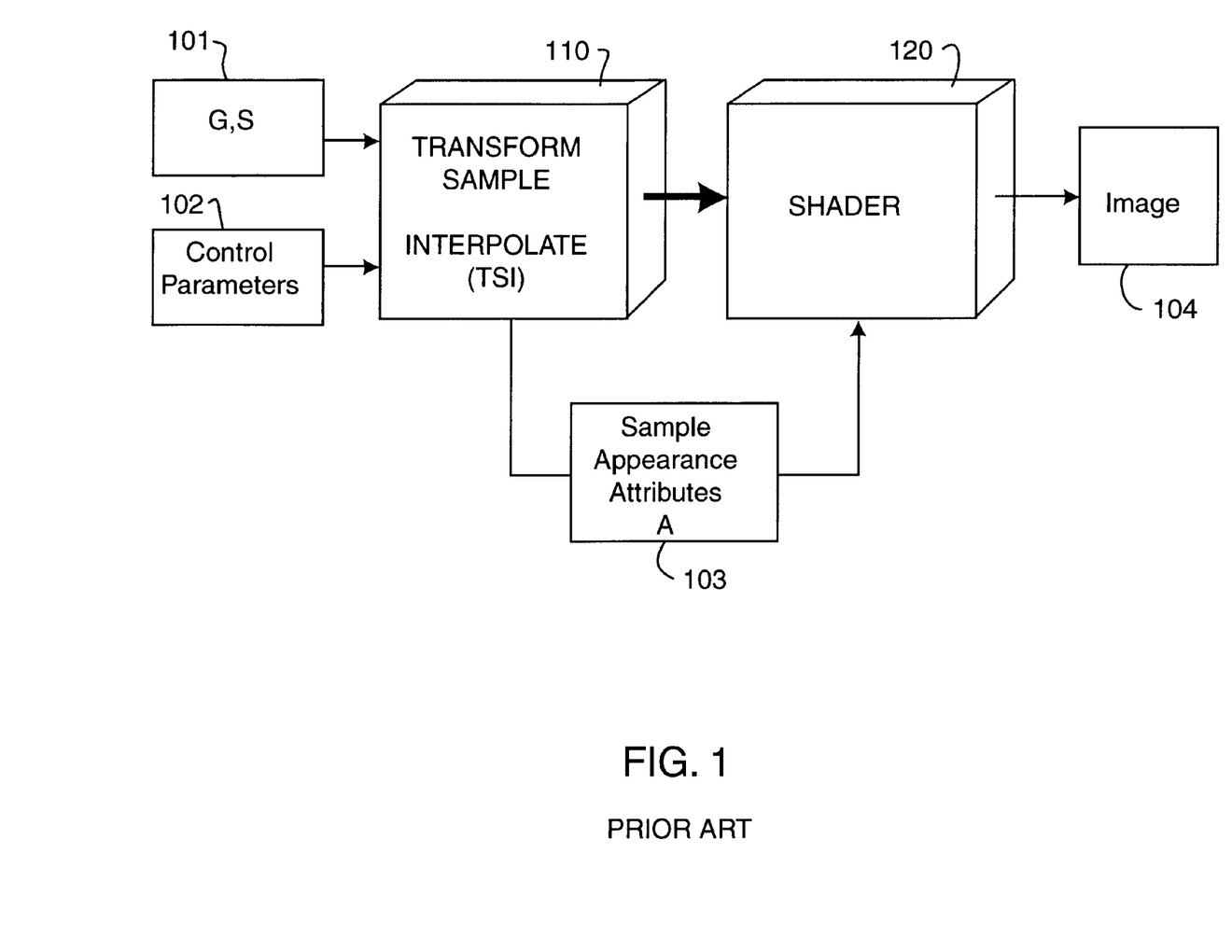
FIG. 1 is a prior art, single-phase rendering system.

Most prior art rendering systems operate in a single phase. FIG. 1 shows a typical prior art rendering system 100. The system includes a transform, sample, and interpolate (TSI) component 110 and a shader component 120. The TSI receives input in the form of an evolving scene description 101, and control parameters 102, for example, a viewpoint, orientation, size, etc. The scene description 101 includes the geometry (G) defining the shape of the objects in the scene, along with a set of procedural shaders (S) which define how each of the objects will be shaded.

It should be noted that some objects can be composed of other objects. For example, a table object can include one top glass object and four steel leg objects. The table object will generally move and scale as a single unit while different shader procedures are likely to be applied to the top glass object and the steel leg objects.

The output of the TSI are sample points having appearance attributes (A) 103. These attributes include values such as the (x, y, z) position of the sample in shading coordinates and image coordinates, a surface normal, the surface patch parameters (u, v), and the texture coordinates (s, t). The TSI transforms the scene description from object coordinates to image coordinates using the current viewpoint. Rasterization can be used to determine the desired samples, and interpolation is used to generate the appearance attributes for the sample points.

The shader (S) 120 applies the one or more procedural shaders to the appearance attributes of each associated object. The output of the shader 120 is a set of colored samples which can be stored in a frame buffer to generate an image 109. The color of each sample combines, for example, the intrinsic color of the underlying sample, color information from texture maps, diffuse and specular reflections caused by light falling on the object, and other effects.

Additional processing steps (composite and filter) can discard the samples that are hidden by other samples, merge translucent samples with the samples behind them, and calculate pixel values from merged sample values.

For high quality output, samples must be calculated at a finer resolution than the pixel grid and multiple (sub-pixel) samples must then be combined by filtering to generate each pixel.

Traditional single phase rendering has a number of problems. First, the rendering is inefficient. In single phase rendering, the entire scene description is processed by both steps 110 and 120 for each image. Thus, each individual image of the sequence is generated as if it were completely different from every other image in the sequence. If thirty images per second are desired, then all the relevant processing must be done thirty times per second. This is straightforward and robust, but time consuming, particularly for complex scenes.

Furthermore, many prior art traditional single phase rendering systems are limited because they employ classical (non-procedural) texture mapping. However, procedural shading extends this rendering paradigm to provide rich images that duplicate and amplify the visual reality of the physical world. Procedural shading has many advantages over systems limited to classical texture mapping: unrivaled richness and image quality, resolution independence, no seams at boundaries, memory efficient (on demand generation of each shaded sample point), appearance changes (e.g., add some dirt) are easily accommodated, surface distortions are more easily avoided, geometry requirements are reduced, and finally prefiltering is supported which results in superior texture filtering.

U.S. Pat. No. 5,864,342, "Method and system for rendering graphical objects to image chunks," issued to Kajiya et al. on Jan. 26, 1999, also described by Torborg et al. in "Talisman: Commodity Realtime 3D Graphics for the PC," ACM Siggraph, Conference Proceedings, pp. 353–363, Aug. 4–9, 1996, teaches a rendering system using a polygon geometry.

That system takes a scene description and control information as input to rasterization and shading to generate 32×32 pixel image "chunks." The chunks are stored in a database. This is done object by object creating chunks in an incremental fashion. Rather than always processing the entire scene description, rapidly changing parts can be processed more often than other parts. This leads to chunk updates that alter the database one chunk at a time.

To generate an image, a full set of chunks is read from the database by an image transformation step, which alters each chunk to partially account for any change in viewpoint. Samples determined from the chunks are sent to a composite and filter step which produces the final image. Due to the intermediate database, chunks can be generated at a slower rate than they are used, concentrating on the chunks that are changing most rapidly. For example, the chunks for an object that is moving in the background can be updated less frequently or with less accuracy than chunks for a foreground object. This makes it possible to generate successive images in an animated sequence without always processing the entire scene for each image.

However, there are many problems with the way chunks are generated and represented that limit their reusability in multiple images, and therefore, limits the benefits of that approach. To start with, all shading is done when chunks are initially generated, and no shading calculations are done when chunks are later used. This allows fast operation, but makes it impossible to adjust a chunk to take proper account of viewpoint sensitive shading effects such as specular reflection. As a result, if the viewpoint changes even a small amount, then the samples generated when reusing a chunk are not the same as those that would be generated if the chunk were recomputed, and image quality suffers. In addition, the chunks are represented as two-dimensional images. This allows fast, space efficient operation, but places strong limits on the way chunks can be transformed.

For the above reasons, the Talisman system either has to process most of the scene description most of the time, or else generate low quality output. The user is faced with either not getting much in the way of efficiency gains, or tolerating bad output. Therefore, it is desired to provide a three-dimensional rendering system that can produce high quality images with reduced processing time.

SUMMARY OF THE INVENTION

The invention provides a method and apparatus for rendering an evolving three-dimensional scene description as a series of two-dimensional images (frames). In the method, an evolving scene description includes object geometries G and their associated shader procedures S. Each shader procedure S is factored into a static procedure $S_s$ and a dynamic procedure $S_d$ such that $S(A,I)=S_d(S_s(A,R),I)$, where A denotes the appearance parameters required to shade objects, I denotes an instance of the control parameters, and R denotes a range of control parameters which include I. Similarly, the rendering procedure TSI (transform, sample, and interpolate) for object geometry is factored into a static procedure $TSI_s$ and a dynamic procedure $TSI_d$ such that $TSI(G,I)=TSI_d(TSI_s(G,R),I)$. The factorization of both S and TSI is chosen to significantly reduce the overall rendering time for the evolving scene. Specifically, viewpoint independent or weakly viewpoint dependent computations $S_s(A,R)$ and $TSI_s(G,R)$ are computed in the static phase of rendering and stored either as independent data structures or as a single combined data structure called the internal representation. This internal representation is then processed by the dynamic phase of rendering to produce each frame.

Since the required dynamic computations to produce a frame are significantly reduced and the required static computations run infrequently, both as a result of a clever factorization and an efficient internal representation, the overall rendering time is reduced.

In one aspect of the invention, only the factorization of the shading procedure S is performed. The static and dynamic phases perform the shading computations as described above. A data structure, called shader maps, is used to store the results of the static shading computations, and the globally reparameterized input geometry is used in the dynamic phase.

In another aspect of the invention, both the factorization of S and TSI is performed. The static and dynamic phases perform both the shading and geometry computations as described above, and a single combined data structure is used to store both the results of the static shading computations and the static geometry computations.

In another aspect of the invention, both the factorization of S and TSI is performed, the static and dynamic phases perform both the shading and geometry computations as described above, and separate data structures are used to store the results of the static shading computations and the static geometry computations. The static shading computations are stored in shader maps.

In another aspect of the invention, the range of control parameters includes a range of viewpoints, and the instance of control parameters includes a particular viewpoint, and the static shader is either independent of the particular viewpoint or weakly dependent on the particular viewpoint.

In another aspect of the invention, the intermediate representation is expressed using an object coordinate system.

The intermediate representation can include a mesh of polygons having vertices connected by edges (called polygonal facets), or, alternatively, the intermediate representation can include shader maps. Both polygonal facets and shader maps are described below.

DETAILED DESCRIPTION OF THE PREFERRED EMBODIMENT

Multi-Phase Rendering

Figure 2:
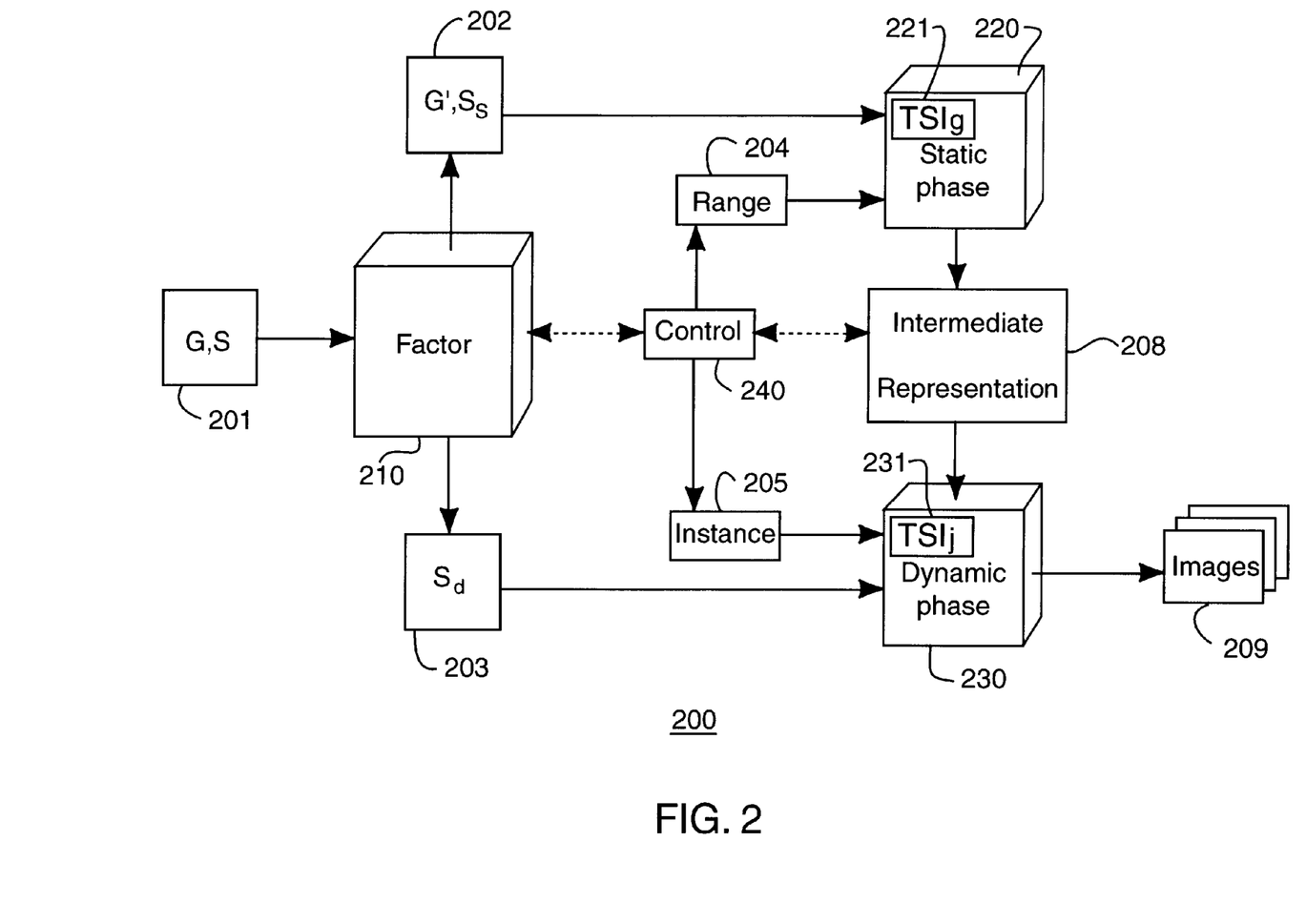
FIG. 2 is block diagram of a multi-phase rendering system according to the invention.

FIG. 2 shows a multi-phase rendering system 200 according to the invention. The system 200 includes a factoring step 210, a static rendering phase 220, a dynamic rendering phase 230, and a controller 240. As above, the system 200 takes an evolving scene description 201 as input. The evolving scene description includes object geometries (G) with associated shader procedures (S). The output of the system 200 is a sequence of images (frames) 209.

The factoring step 210 separates the evolving scene description 201 into static parts 202 and dynamic parts 203. The factoring step is a pre-processing step to the two rendering phases 220 and 230. The static part includes static geometry (G'), the static transform, sample, and interpolate procedure $TSI_s$, and static shader procedures ($S_s$); the dynamic part 203 includes the dynamic transform, sample, and interpolate procedure $TSI_d$ and the dynamic shader procedures ($S_d$). The static phase 220 performs shading and further processing of G' according to a range 204 of values, for example, a range of viewpoints, whereas the dynamic phase shades and rasterizes for particular instances 205 of values. A particular instance corresponds to a particular frame.

Both phases can include transform, sample, and interpolate components $TSI_s$ 221 and $TSI_d$ 231. Note: when using shader maps as described below, $TSI_s$ 221 is optional. In one embodiment of the invention, the $TSI_s$ performs a floating-point perspective transformation on G' using a representative viewpoint to produce a fixed point intermediate representation which is valid for a range of values. $TSI_d$ then applies a fixed-point perspective warp to the intermediate representation for a particular instance and frame. The fixed point representation used by $TSI_d$ allows much more efficient computation, but does not support the large dynamic range supported by floating-point. The separation that results from the factoring 210 reduces processing time, storage, and bus bandwidth because the intermediate representation needs to be "refreshed" only when there is a significant change, for example, a large change in viewpoint, or an entirely different scene.

Figure 3:
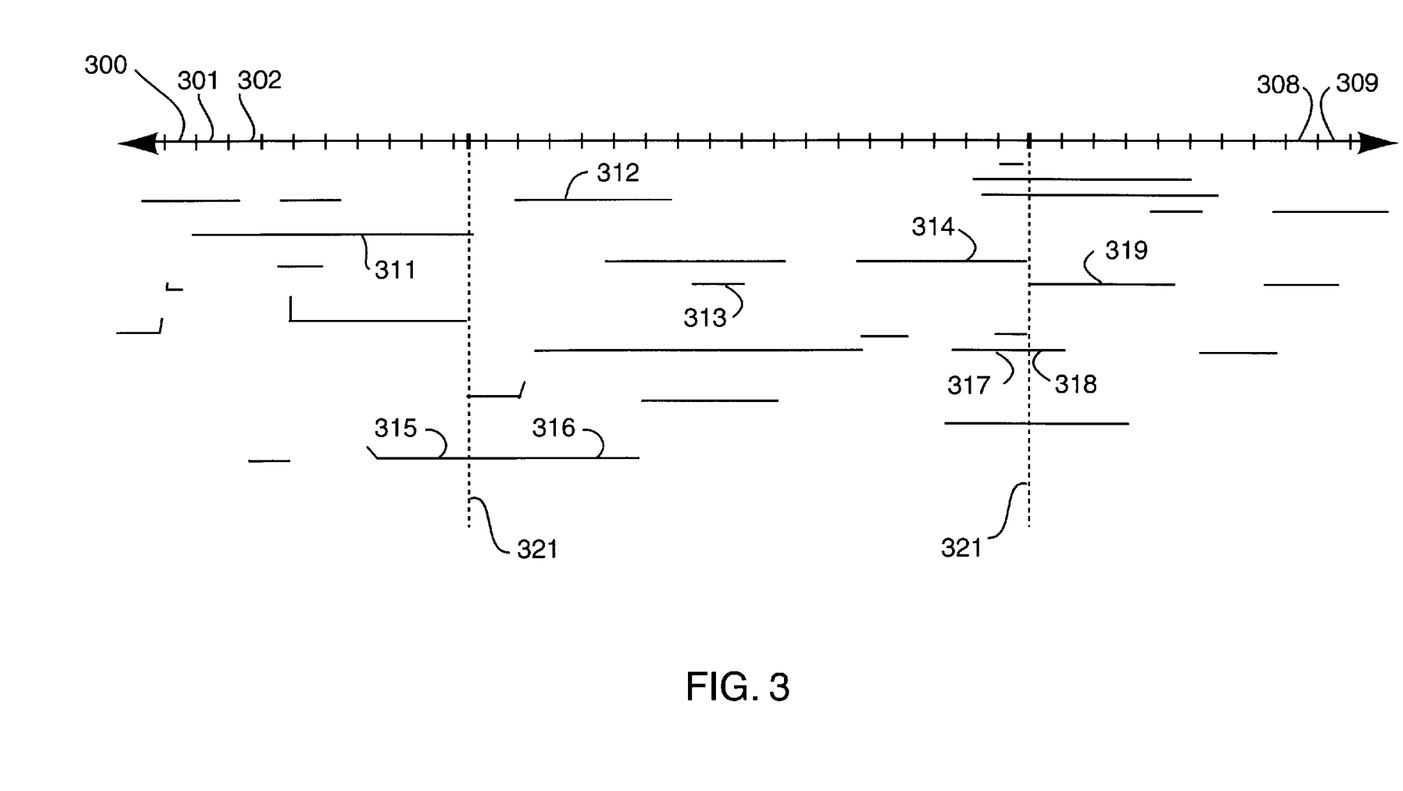
FIG. 3 is a timing diagram of static and dynamic objects.

FIG. 3 is used to contrast the static and dynamic rendering phases according to the present invention. Static refers to those objects (comprised of geometrical descriptions G and shaders S) and processing that are substantially the same over a number of images. Dynamic refers to objects and processing for every frame. In FIG. 3, the horizontal line 300 indicates a sequence of images 301–309, where each tick mark represents a frame. The horizontal lines 311–319 below indicate the appearance (and disappearance) of objects in the sequence 300. The vertical dashed lines 321 and 322 indicate scene changes.

The purpose of the static rendering phase 220 is to occasionally process the (static) objects (comprised of geometrical descriptions G and shaders S) of the scene description that are constant or relatively constant. Background objects, or foreground objects that remain mostly the same, except for maybe small details in position, size, or orientation can be considered static. Also, shading computations that are independent or weakly dependent on viewpoint and other control instance parameters can be considered static. Only when there is an abrupt change in the scene description, or the accumulated change in an object over many frames exceeds some threshold, does the static phase need to reprocess the corresponding part of the scene description. In contrast, the dynamic rendering phase 230 processes each object in the scene for every frame in the sequence.

The controller 240 supplies the static rendering phase 220 with the range of control parameters 204. The range of control parameters indicate, for each G and S, how the appearance of the shape (G) and shade (S) are to be changed over that range, if at all. For example, the range of control parameters 204 can be a range of viewpoints, a range of geometrical sizes, or the (u,v) ranges over which a shader S should be evaluated.

In the case that an object is moved so that additional detail becomes more (or less) visible, the scene description for that object needs to be reprocessed to show (or hide) those details. In other words, the end of a range is a threshold that reactivates the static rendering phase for particular objects. In some implementations, such as a video game, the operation of the controller can be in response to user input, and the controller can attempt to predict the manner in which the scene is evolving, and generate corresponding control parameters.

In addition, the static phase or the controller can anticipate the introduction of new objects into the scene. These objects can be pre-processed ahead of their introduction.

The static phase 220 produces an intermediate representation 208 that is easy to process by the dynamic rendering phase 230. For example, the intermediate representation 208 is in a form so that the dynamic phase 230 can use high-speed fixed-point arithmetic units, instead of the slower floating-point arithmetic units used by the static phase 220.

The dynamic rendering phase 230 applies the dynamic shader procedures 203 and the dynamic transform, sample, and interpolate procedures $TSI_d$ 231 to the intermediate representation 208 of the static rendering phase using instances of control parameters 205. There is an instance 205 for every frame in the sequence. The purpose of the dynamic phase is to "adjust" the intermediate representation 208 (comprised of both shape and shade data) for any small incremental differences in the appearance of objects in successive images. For example, the difference might correspond to the distance an object moves in $1/30^{th}$ of a second, or a like shift in the viewpoint. Each phase may also perform some transformation, sampling, and interpolation as described in greater detail below.

The two rendering phases 220 and 230 can operate independently of each other, and at different rates. The static phase 220 operates on an object only when there is a significant change in the appearance of that object. The static phase can store and update the intermediate representation 208 for that object in a database. The dynamic phase 230 executes for every image in the sequence.

Factoring

For most shaded three-dimensional objects, there exists a continuous multi-dimensional surface parameterization. For example, objects defined by meshes of parametric patches have a per-patch parameterization that can be joined at the borders. Many of the appearance attributes can be generated as a function of this global parameterization. This global parameterization is stored in G'. The parts that cannot be generated might depend on dynamic parameters such as viewpoint, or a change in position of the object in the scene. Similarly for shape, the original TSI function can be factored into a static function and a dynamic function where the overall rendering time is reduced.

Therefore, the invention factors the shader procedures (S) into $S_s$ 202 and $S_d$ 203 and the original TSI function into $TSI_s$ 221 and $TSI_d$ 231. The static shader $S_s$ is constant (or nearly so) for control parameters in the range 204, while the dynamic shader $S_d$ depends on the instances 205 of the control parameters for each image. The $TSI_s$ 221 procedure, in conjunction with the $S_s$ 202 procedure, transforms the globally parameterized geometry G' into an intermediate representation 208 tailored to very rapid rendering by $TSI_d$ 231 and $S_d$ 203 assuming that, for example, the current viewpoint is in the range 204.

One key insight in multi-phase rendering is that, from one image to the next in an animated sequence, the scene description and/or viewpoint typically only change by a small amount. More specifically, some of the objects in the scene may move a little, a small number of objects may appear or disappear, and the viewpoint may move a little, but large changes happen infrequently. The other key insight is that since many of the computations required by procedural shading are independent of the viewpoint, these computations can be stored and retrieved by the dynamic phase to reconstruct the output of the original unfactored shader procedure S.

The fundamental reason for small changes in the scene description and/or viewpoint is that two consecutive images are typically separated by only a very small amount of time, e.g., $1/30^{th}$ of a second. If a scene description and viewpoint only change a little bit from one image to the next, then most of the (static) transforming, sampling, and interpolating ($TSI_s$ 221) for the first image where an object appeared can be reused, as long as the intermediate representation 208 is sufficient for the new samples to be generated.

Similarly, if a scene description and viewpoint only change a little from one image to the next, then most of the computation done by shading ($S_s$) for the first image is still applicable to the second image. In particular, most of the information that contributes to the color of a particular point on an object are inherent properties of the point itself and are largely independent of the exact position of the object in relation to a viewpoint. The most notable exception to this viewpoint independence is specular reflection which is highly sensitive to the exact viewpoint. Therefore, the multi-phase rendering according to the invention breaks shader procedures up into two parts, the first of which ($S_s$) depends only weakly on the viewpoint and can be reused for multiple images, and the second of which ($S_d$) is recalculated for every image in the sequence.

The central feature of multi-phase rendering is that the dynamic phase 230, including $TSI_d$ 231 and $S_d$ 203, operates on the entire scene (every object) for every image, while the static phase 220 processes objects of the scene only occasionally, if at all. The static phase 220 is organized to operate on one object at a time so that it can operate on only part of a scene at a given moment. In many animated sequences, only a small part of the scene description requires processing by the static phase in order to generate a next image.

For most animation sequences, the static phase runs infrequently. Therefore, the intermediate representation 208 is designed so that $TSI_d$ 231 applied to the intermediate representation 208 is much faster than TSI applied to G (as in the prior art). Also, S is factored so that $S_d$ (which includes the access and processing of the stored computations of $S_s$) is faster than S. Consequently, multi-phase rendering can produce a given quality of output in significantly less time than single-phase rendering.

From image to image in an animation sequence, two kinds of events trigger the need to reprocess an object in the static phase: changes in viewpoint and changes in G'. Changes of viewpoint relative to an object trigger static processing whenever the current viewpoint leaves the range 204 assumed when the object was last processed.

Most of the changes in an animated sequence are represented by changes in G'. Some changes such as an object moving in the scene can be accommodated by incrementally modifying the intermediate representation 208 without having to reprocess the object in the static phase. Other changes, such as the appearance of a new object in a scene, require the operation of the static phase.

Intermediate Representations

An important design consideration in multi-phase rendering is the choice for the intermediate representation 208 that is passed from the static to the idynamic phase.

Therefore, the intermediate representation according to the invention is expressed using object coordinates to allow changes over a range of values, unlike the image chunks of the prior art.

The intermediate representation 208 is three-dimensional, so it specifies the (x,y,z) positions of data values, unlike the two-dimensional values of the image chunks of the prior art. Three-dimensional information is needed to accurately determine how to render the intermediate representation for a new current viewpoint in the range 204.

The representation not only specifies isolated data values, but also specifies how values adjoin. This adjoining information has the effect that changes of viewpoint will not lead to erroneous cracks or overlaps in the images. In addition to basic color and translucency information, the intermediate representation 208 contains information needed by $S_d$. For example, if $S_d$ supports specular reflection, then the intermediate representation 208 specifies lighting normals so that reflections can be calculated accurately.

The resolution of the intermediate representation is significantly higher than the pixel resolution of the images in order to generate high quality antialiased images. The evolving object geometry of G itself satisfies all these requirements, but G is time consuming to process. The intermediate representation has a form that can be very rapidly processed by the dynamic phase with a high degree of parallelism.

For this to be possible, the data values must be simple (e.g., stored in a fixed-point format), localized, and all in the same format, or a very small set of formats. This contrasts with G where some data specify information about large areas of the image. Information from multiple sources must be combined during shading (a second kind of failure to be local), and a wide range of radically different representations for objects are used.

Figure 4:
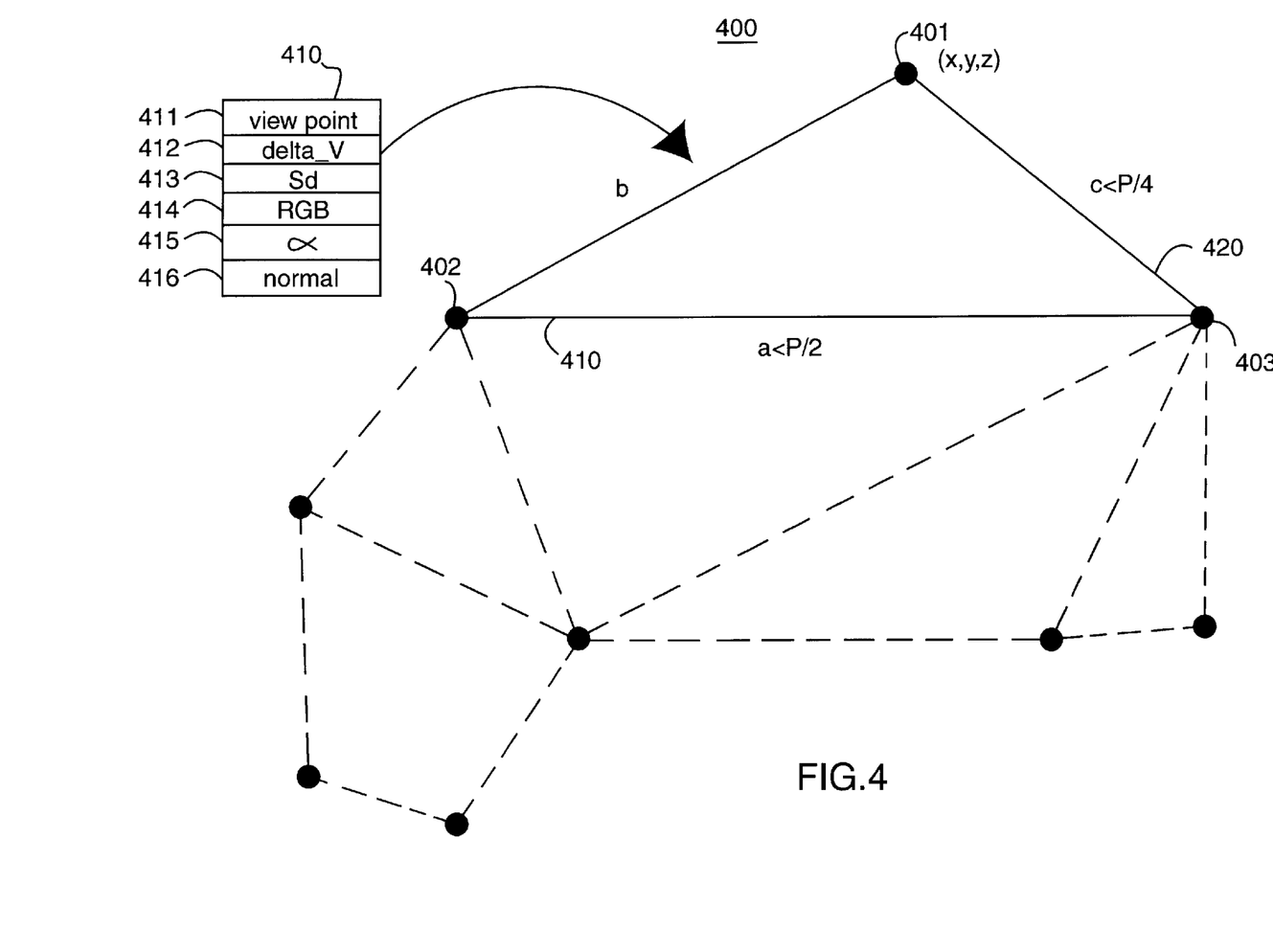
FIG. 4 is a diagram of polygonal facets used in a first intermediate representation used by the invention.

Polygonal Facets—An Intermediate Representation Combining Shape and Shade Attributes As shown in FIG. 4, one intermediate representation uses "polygonal facets." Polygonal facets act as an intermediate description of a graphical scene. Polygonal facets are the result of processing objects (G') in the static phase 220. Polygonal facets encode much of what is needed for dynamic rendering. However, polygonal facets leave enough undone so that the dynamic phase 230 can generate highly accurate images from a variety of different viewpoints. This representation also makes it possible to support the relative motion of objects in a scene merely by changing the positions associated with polygonal facets rather than recomputing them.

FIG. 4 illustrates a polygonal facet 400 that is represented as a small triangle. Typically, polygonal facets are either triangles or quadrilaterals. Because a polygonal facet is a polygon with edges, it is possible to specify the exact way polygonal facets adjoin. An object is represented by a mesh of polygonal facets that covers its surface. The fact that polygonal facets are specified using shared vertices and edges means that erroneous cracks and overlaps will not arise when a group of polygonal facets are rendered from a changed viewpoint.

Each polygonal facet is associated with a set of data values including its vertices and a block of additional data 410. For instance, the triangular facet 400 has vertices 401, 402 and 403, and is associated with the data block 410. The position of a polygonal facet in three dimensional space is specified by the coordinates (x,y,z) of each vertex of the polygonal facet. This allows the polygonal facet to be accurately rendered from alternate viewpoints. As stated above, the coordinates are specified in object space rather than image space to facilitate the reuse and modification of polygonal facets, e.g., when an object moves.

If the distance between pixels in the viewing plane is P, then polygonal facets are generated in the static phase 220 so that the apparent length of each edge when projected on the viewing plane is less than P/2. This guarantees that the polygonal facets are small enough so that high quality images can be produced from them. In addition, wherever possible, the apparent length of edges is kept longer than P/4. This reduces the number of polygonal facets and therefore the required computation in both phases.

The small size of the polygonal facets allows information to be specified at a significantly higher level of detail than the final image. This allows high quality anti-aliasing of the resulting image. Although the spacing between polygonal facets is based on the spacing between pixels, polygonal facets are aligned with the objects they represent, rather than the pixels in any one image.

The data block 410 includes the viewpoint 411 from which the polygonal facet was originally rendered by step 220, and a delta__V value 412 that specifies the maximum change of viewpoint over which the polygonal facet can accurately be used. This value can be represented in many ways including a polar coordinate-like representation with respect to the object. For instance, delta__V might specify that when the distance between the viewpoint and the object changes by more than a factor of 2, or moves more than 20° around the object, then the polygonal facet must be regenerated.

The data block 410 also specifies the dynamic shader $S_d$ 413 to be used. To understand the meaning of this, consider the following. One of the items specified by a scene graph is the shading calculations to be used for each object. Suppose that the scene graph specifies that a shader procedure S is to be used for an object A. Also associated with each polygonal facet is an RGB color 414 and a translucency value ($\alpha$) 415 that is calculated by $S_s$. In addition, a surface normal 416 used for lighting calculations is stored. The dynamic shader $S_d$ 413 uses this stored data to compute the shaded value for each sample point.

The polygonal facet data generated by the static phase can be stored in a database indexed by the object. The static phase keeps this database updated, occasionally creating new intermediate descriptions of objects. This updating is done, for example, whenever the relationship between the viewpoint and an object changes sufficiently so that the stored intermediate representation 208 can no longer be used for efficient and accurate output. For instance, if the distance from the viewpoint to an object is cut in half, a new more detailed intermediate representation is needed to maintain accuracy. Alternatively, if this distance doubles a new lower resolution intermediate representation is needed to maintain optimal efficiency.

Shader Maps

Figure 5:
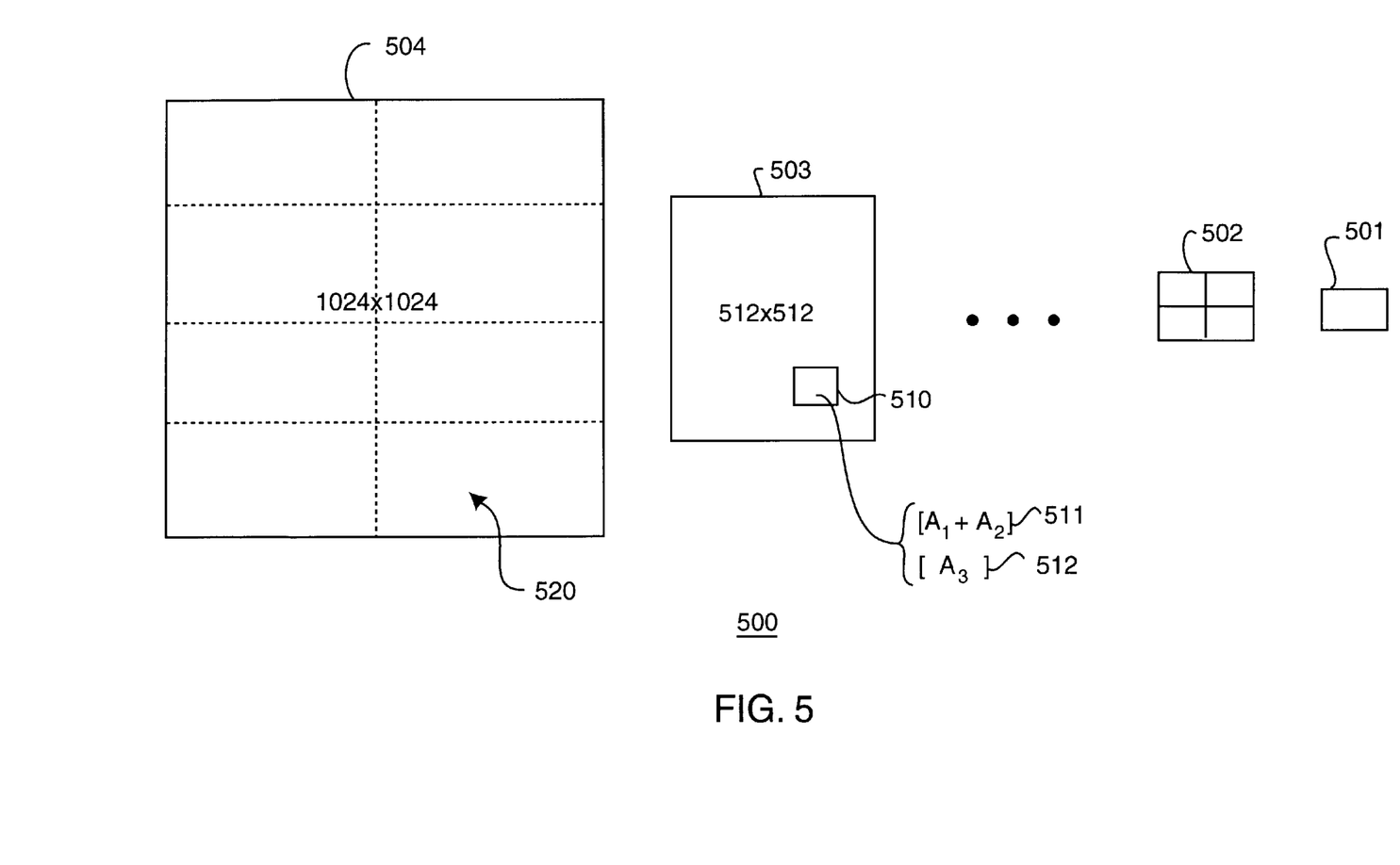
FIG. 5 is a diagram of shader maps used in a second intermediate representation used by the invention.

As shown in FIG. 5, another intermediate representation uses multi-resolution shader maps 501–504. Shader maps can be considered an evaluation of $S_s$ at multiple levels of detail. As shown in FIG. 5, shader maps 500 have a structure similar to well known prior art texture maps, also known as N-tuple mipmaps, where each map represents a function from $[0, 1]^2 \rightarrow R^N$ at a specific resolution). However, shader maps serve a much broader purpose than texture maps in that the shader maps enable procedural shading instead of simple texture mapping.

Like texture maps, shader maps 501–504 are computed and stored for multiple resolutions, e.g., 1×1, 2×2, . . . , 512×512, 1024×1024, etc. Because shader maps are stored at multiple resolutions, varying sampling rates can easily be accommodated. Unlike texture mapping, shader maps use a tiling scheme to minimize computation and storage. A tile consists of a rectangular subset of a map, e.g., a 16×16 region of a 512×512 map. Tiles, and hence maps, are populated with the $S_s$ computations on demand.

Each n-tuple i 510, in a particular map, stores values that are statically known or can be computed in the static phase. For example, a particular shading computation is expressed as $C=A_1+A_2+(A_3)(K_{spec})$. Here, the values $A_1$, $A_2$, and $A_3$ are static quantities, perhaps computed from complex expressions of other static quantities. The value $K_{spec}$ is the contribution due to specular lighting, which is dynamically dependent on the current viewpoint.

In this case, the n-tuple i 510 stores the sum of $A_1$ and $A_2$ 511 and the value $A_3$ 512. Then, the dynamic phase only needs to compute the contribution due to specular lighting $K_{spec}$, the product $(A_3)(K_{spec})$, and the final sum C. Since the static quantities typically represent the bulk of the computational burden of a shader, there are significant savings in shading execution time relative to prior art systems.

To compute the final shaded value (e.g., C in the expression defined above), the dynamic phase needs to resample a viewpoint dependent subset of n-tuple entries contained in the appropriate shader map. When using isotropic filtering to perform the resampling, similar to trilinear mipmapping as described by Williams in "Pyramidal Parametrics," SIGGRAPH 1983, pp. 1–11, the reconstruction is performed by combining 2 n-tuple probes from adjacent levels of resolution in a shader map to form the end result of the filtering operation. Each probe is comprised of a set of n-tuple entries in a shader map level. The n-tuples comprising this set are combined with an isotropic filter, e.g., a 2×2 bilinear filter, to produce the n-tuple for that probe. The set of entries for each probe is the set of entries within the support of the isotropic filter.

Similarly, when using multi-probe anisotropic filtering to perform resampling, similar to the Feline algorithm as described by McCormack et al. in "Feline: Fast Elipical Lines for Anisotropic Texture Mapping," WRL Research Report 99/1, July 1999, the reconstruction is performed by combining multiple n-tuple isotropic probes, where each isotropic probe is the end result of an isotropic filtering operation as described above. The n-tuple isotropic probes are weighted and combined according to an anisotropic filter.

These generalizations of isotropic and anisotropic filtering to a richer set of data representations, i.e., the stored static quantities computed by $S_s$, in conjunction with the computations performed by $S_d$, create a high quality reconstruction of the output of the original shader S with dramatically lower computational costs. This is a key effect of the present invention.

Before rendering any frame, the controller 240 can first generate partially populated shader maps for each shader procedure so the resampling done by $S_d$ is guaranteed to have some data. For example, the controller can force the six lowest resolution shader maps (e.g., 1×1, 2×2, 4×4, 8×8, 16×16, and 32×32) to be available at all times so that $S_d$ never has to wait. There are two alternatives for predicting the tiles required by the resampling process (the resampling process is a part of $S_d$ 203).

The first alternative generates the tiles adjacent to the tiles requested previously by the resampling process during rendering. In the second alternative, the controller 240 includes a low resolution rendering engine that periodically generates the entire scene to predict future shader map needs. If the prediction turns out to be wrong, then lower resolution shader maps can be used. The tiles can be stored in and/or removed from a memory using a least recently used (LRU) algorithm to reduce storage requirements.

Shader maps can readily be applied to various forms of geometry, e.g., NURBS, bicubic patches, triangles, point samples, volumes, surfers, and other three-dimensional geometric formats. Because shader maps are similar in structure to texture maps, the intermediate representation of geometries can be in any form that is compatible with texture maps, and subsequently the invention can be employed with known texture mapping systems such as OpenGL™ and RenderMan™. For geometry lacking a parameterization, a necessary ingredient for texture mapping, the factoring operation creates a global parameterization and attaches it to the input geometry G to form G'.

Applications

The primary intended application of multi-phase rendering according to the invention allows complex animated scenes to be rendered with a stable high frame rate, e.g., thirty frames per second. Used this way, the static phase processes as much of the scene description as time allows, even if the quality of the intermediate representation 208 is reduced occasionally to meet the "frame" rate. Alternately, multi-phase rendering can be used to generate output of constant quality at a varying frame rate.

While multi-phase rendering is designed primarily to support animated sequences, it is also useful when rendering any group of images that are based on similar scene descriptions. For example, if a person were exploring variations of an image to arrive at just the right single image, then multi-phase rendering could speed the exploration process. Multi-phase rendering can also be useful when creating a single image, when the image contains repeated elements that can be rendered once in the static phase, and used multiple times in the dynamic phase.

The motivation behind multi-phase rendering is to support real-time interactive three-dimensional graphics, e.g., three-dimensional visualization and game playing. However, it can also make the production of animated movies and the like more efficient.

Extensions

The discussion above presents multi-phase rendering in its simplest form. There are many important ways it can be extended.

A key extension of the invention is realizing that while both $TSI_s$ and $TSI_d$, and both $S_s$ and $S_d$ are most easily understood as logically distinct processes, they are very similar from a hardware perspective. In particular, resampling and reinterpolation done by $TSI_d$ is essentially a variation of the sampling and interpolation done by $TSI_s$, and $S_d$ is a specialized case of the same kind of processing as $S_s$. As a result, a hardware implementation of multi-phase rendering can use the same components to support much of both the static and dynamic phases, time multiplexing the circuits between the two tasks. This hardware can generate the intermediate representation and the samples for the image.

For example, a shader processor can occasionally perform the static computations while a control unit provides the range of control parameters to produce the intermediate representation. The same processor performs the dynamic computations for every image while the control unit supplies the instance of the control parameters to generate the colored samples for the image.

In principle, the intermediate representation can be completely independent of viewpoint, rather than dependent on a range of viewpoints. This is true for many of the computations required by procedural shaders. Now, consider this observation about viewpoint independence as it pertains to geometry. In some situations, such as a scene with a rapidly rotating and moving object, this independence is useful. However, in other situations, a certain amount of viewpoint dependence is valuable. In particular, if it is known that an object, e.g., a distant building, has a restricted range of viewing angles, then the memory requirements for storing the corresponding intermediate representation can be reduced by an order of magnitude or more by omitting parts of the object that will never be viewed, and using a lower resolution for parts of the object that face sideways from the viewpoint. With this approach, storage requirements are reduced and the dynamic phase is accelerated.

By reducing the size of the intermediate representation, the computation in the dynamic phase is proportional to the number of pixels in the image, rather than the complexity of the scene description.

If the level of detail in the intermediate representation is allowed to vary dynamically by using a hierarchical representation, then the static phase can generate relatively detailed information, and the dynamic phase can select the exact level of detail that is most appropriate for a current viewpoint. This decreases the number of computations done in the dynamic phase at the cost of increasing the number of computations done in the static phase. This is a good trade-off when the intermediate representation is used for many successive frames in the animated sequence. This also makes the transitions smoother when levels of detail change.

As stated above, the intermediate representation can also contain descriptions of objects about to enter the scene; these can be precomputed by the static phase. Then, the transition to the scene including the new object can be accomplished in a single frame.

Advantages

Rendering efficiency is increased without sacrificing image quality by separating static shading requirements from dynamic ones. Static requirements are dealt with at a much lower frequency, and at a correspondingly lower computational cost. Dynamic requirements (including the retrieval of previously computed static requirements from storage) are much smaller than the original shading requirements and therefore can be computed much more efficiently.

Similarly, factoring the original geometry into static and dynamic components also increases rendering efficiency. For example, perspective transformations on static components require floating point operations in order to produce fixed point coordinates at an arbitrary viewpoint. Perspective transformations on the dynamic components can use fixed point computations to modify the fixed point coordinates at the original viewpoint to a range of nearby viewpoints. This significantly reduces processing time, storage, and bus bandwidth because the intermediate representation needs to be refreshed infrequently.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for rendering an evolving scene description including an object geometry and a shader procedure as an image, comprising the steps of:

factoring the shader procedure into a static shader procedure and a dynamic shader procedure;

applying the static shader procedure to the object geometry using a range of control parameters to produce an intermediate representation; and     applying the dynamic shader procedure to the intermediate representation using an instance of the control parameters to generate colored samples for the image.

2. The method of claim 1 wherein the static shader procedure is independent of the range of control parameters.

3. The method of claim 1 wherein the range of control parameters includes a range of viewpoints, and the instance of control parameters includes a particular viewpoint.

4. The method of claim 1 wherein the intermediate representation is expressed in three-dimensions using a coordinate system of the object geometry.

5. The method of claim 1 wherein the intermediate representation includes multiple levels of resolution.

6. The method of claim 5 wherein each level of resolution is stored as a shader map.

7. The method of claim 6 wherein the shader maps include at least a lowest level of resolution shader map.

8. The method of claim 6 wherein each shader map includes a plurality of n-tuples.

9. The method of claim 8 wherein rectangular groups of n-tuples are organized as tiles.

10. The method of claim 9 further comprising the step of:
predictively generating the tiles according to adjacent previously generated tiles.

11. The method of claim 9 further comprising the step of:
rendering a low resolution image of the evolving scene to anticipate tiles required by the dynamic shader procedure.

12. The method of claim 9 wherein the tiles are maintained in a memory using a least recently used algorithm.

13. The method of claim 1 wherein the dynamic shader procedure performs isotropic filtering on the intermediate representation.

14. The method of claim 1 wherein the dynamic shader procedure performs multi-probe anisotropic filtering on the intermediate representation.

15. The method of claim 1 wherein the application of the dynamic shader procedure on the intermediate representation replaces texturing and lighting.

16. The method of claim 1 wherein the object geometry includes a mesh of non-uniform rational B-spline surfaces.

17. The method of claim 1 wherein the object geometry includes bicubic patches.

18. The method of claim 1 wherein the object geometry includes polygons.

19. The method of claim 1 wherein the object geometry includes point samples.

20. The method of claim 1 wherein a plurality of images are generated for the evolving scene, and wherein the dynamic shader procedure is applied for every image, and the static shader procedure is applied for a subset of the images.

21. The method of claim 1 wherein the evolving scene description includes a transform, sample, and interpolate procedure, and further comprises the steps of:
factoring the transform, sample, and interpolate procedure into a static transform, sample, and interpolate procedure and a dynamic transform, sample, and interpolate procedure;
applying the static transform, sample, and interpolate procedure to the object geometry using a range of control parameters to produce the intermediate representation; and
applying the dynamic transform, sample, and interpolate procedure and an instance of the control parameters to the intermediate representation to generate colored samples for the image.

22. The method of claim 21 wherein the intermediate representation includes a mesh of polygons having vertices connected by edges.

23. The method of claim 22 wherein the vertices are specified using three dimensions using a coordinate system of the object geometry.

24. The method of claim 22 wherein the edges are less than P/2 and greater than P/4, where P is the spacing between pixels in the image.

25. The method of claim 22 wherein each polygon has an associated data block, the data block storing a viewpoint, a range of viewpoints, a particular dynamic shader procedure, an RGB color, a translucency value, and a surface normal.

26. The method of claim 21 wherein the object geometry is transformed by the static transform, sample, and interpolate procedure using a representative viewpoint and high dynamic range arithmetic to produce a low dynamic range intermediate representation valid for the range of control parameters, and the dynamic transform, sample, and interpolate procedure performs a perspective warp on the low dynamic range intermediate representation to produce the image.

27. An apparatus for rendering an evolving scene description including an object geometry and shader computations as an image, comprising:
a shader processor performing static shader computations and dynamic shader computations;
a control unit providing the shader processor with a range of control parameters while the shader processor is performing the static shader computations on the object geometry to produce an intermediate representation, and providing the shader processor with an instance of the control parameters while the shader processor is performing the dynamic shader computations on the intermediate representation to generate colored samples for the image; and
a memory, connected to the shader processor, storing the intermediate repreesentation.

28. The apparatus of claim 27 wherein the apparatus renders a plurality of images for the evolving scene, and wherein the shader processor performs the dynamic shader computations for every image, and the static shader computations for a subset of the images.

29. The apparatus of claim 27 wherein the memory stores shader maps.

30. The apparatus of claim 27 wherein the evolving scene description includes transform, sample, and interpolate computations, and further comprising:
a transform, sample, and interpolate processor performing static transform, sample, and interpolate computations and dynamic transform, sample, and interpolate computations;
a control unit providing the transform, sample, and interpolate processor with a range of control parameters while the transform, sample, and interpolate processor is performing the static transform, sample, and interpolate computations on the object geometry to produce an intermediate representation, and providing the transform, sample, and interpolate processor with an instance of the control parameters while the transform, sample, and interpolate processor is performing the dynamic transform, sample, and interpolate computations on the intermediate representation to generate colored samples for the image.

* * * * *